(12) United States Patent  
Trehan

(10) Patent No.: US 12,470,388 B2  
(45) Date of Patent: Nov. 11, 2025

(54) METHOD AND SYSTEM FOR AUTHENTICATING AN OUTCOME USING NON-FUNGIBLE TOKENS (NFTS)

(71) Applicant: Rajiv Trehan, Bangkok (TH)

(72) Inventor: Rajiv Trehan, Bangkok (TH)

(73) Assignee: Rajiv Trehan, Bangkok (TH)

( * ) Notice: Subject to any disclaimer, the term of this patent is extended or adjusted under 35 U.S.C. 154(b) by 66 days.

(21) Appl. No.: 18/610,553

(22) Filed: Mar. 20, 2024

(65) Prior Publication Data

US 2024/0323019 A1 Sep. 26, 2024

Related U.S. Application Data

(60) Provisional application No. 63/453,175, filed on Mar. 20, 2023.

(51) Int. Cl.  
*H04L 9/32* (2006.01)  
*G06F 40/253* (2020.01)  
*H04L 67/1396* (2022.01)

(52) U.S. Cl.  
CPC .......... *H04L 9/3213* (2013.01); *G06F 40/253* (2020.01); *H04L 67/1396* (2022.05)

(58) Field of Classification Search  
CPC .. H04L 9/3213; H04L 67/1396; G06F 40/253  
See application file for complete search history.

(56) References Cited

U.S. PATENT DOCUMENTS

| | | | |
|---|---|---|---|
| 2020/0119904 A1* | 4/2020 | Philyaw | H04L 63/105 |
| 2020/0252408 A1* | 8/2020 | Bankston | H04L 63/0407 |
| 2023/0111621 A1* | 4/2023 | Kumar | G06N 3/088 |
| | | | 705/38 |

* cited by examiner

*Primary Examiner* — Clayton R Williams  
(74) *Attorney, Agent, or Firm* — Kendal M. Sheets

(57) ABSTRACT

This disclosure relates to a method for authenticating an outcome using Non-Fungible Tokens (NFTs). The method includes recording in real-time, each of a set of user actions corresponding to a task based on a prompt received from a user. Each of the set of user actions are performed by the user to generate an outcome corresponding to the task. The method further includes contemporaneously analyzing each of the set of user actions based on a set of authentication parameters. The method further includes generating a task validation report corresponding to the outcome of the task. The method further includes assigning an NFT to the outcome and the task validation report associated with the task.

17 Claims, 5 Drawing Sheets

METHOD AND SYSTEM FOR AUTHENTICATING AN OUTCOME USING NON-FUNGIBLE TOKENS (NFTS)

CROSS-REFERENCE TO RELATED APPLICATION

This application claims priority benefits under 35 U.S.C. § 119(e) to a U.S. Provisional Application No. 63/453,175, filed on Mar. 20, 2023, which is hereby incorporated by reference in its entirety.

TECHNICAL FIELD

This disclosure relates generally to Non-Fungible Tokens (NFTS), and more particularly to a method and a system for authenticating an outcome using NFTs.

BACKGROUND

Artificial intelligence (AI) technology is constantly evolving, which is continually changing our reality and presenting us with new opportunities to improve our way of life. For the longest time, the human-technology connection was based on the assumption that creativity, independent thought, and art are what distinguishes humans from technology, as the technology, even at its most advanced, will always be a tool. However, with the advancement in AI technology, today, AI tools are capable of writing poems, essays, research and scientific papers and also scripts for movies. In addition, the AI tools are even capable of producing art and music work. The content produced using these AI tools is produced with such sublimity, that it often becomes difficult to judge whether the content is AI generated content or manually produced by humans.

The AI tools configured for producing such content, falls under an area of AI referred as Generative AI. Generative AI is a technique that allows users to produce new text, audios, codes, molecular formals, designs, proposals, ideas, patents or visual output from pre-existing materials, such as pre-existing text, pr-existing codes, pre-existing ideas, and the like. With Generative AI, computers can identify the underlying problem statement from the given input and generate suitable response based on the identified problem statement In other words, Generative AI employs AI and machine learning techniques to enable computers to produce AI content such as text, photos, audio, and video content based on training data, in a way that convince humans to believe that the generated AI content is a user generated content, i.e., same as the one generated by humans. Moreover, existence of tools that integrates Generative AI have appeared over past few years and are commercially available in wide variety and are intended to autonomously execute a variety of activities that have traditionally been linked with human capabilities.

Examples of some of the commercially available Generative AI tools configured for generating the artificial content includes DALL.E 2, ChatGPT, Stable Diffusion, Lensa, and the like. These Generative AI tools not only generate human-like content but are also easily operable and accessible. Moreover, these Generative AI tools, also known as foundation models, have opened up a new world of possibilities for businesses and people involved in content production. Automated content production, improved content quality, more content diversity, and personalized content are just a few of the possibilities. However, despite its capabilities, Generative AI also brings up concerns, such as deepfakes content, truthfulness and accuracy, bias and discrimination leading to discriminatory outcomes and unjust decisions, responsibility and accountability, privacy, ownership and control, job displacement, and misuse of these Generative AI tools in the field of education, marketing, and malware or social engineering. Further, due to the aforementioned problems, it is critical for end users like you and me to understand whether the information or digital content that we consuming on the internet or on social networking sites is genuinely produced by humans or is AI created artificial content in order to consume AI-generated content with caution.

Therefore, there is a need for an efficient and robust approach that may enable end users to distinguish human produced content from the AI created content based on process of producing the content.

SUMMARY

In one embodiment, a method for authenticating an outcome using Non-Fungible Tokens (NFTs) is disclosed. In one example, the method may include recording in real-time, each of a set of user actions corresponding to a task based on a prompt received from a user. It should be noted that each of the set of user actions may be performed by the user to generate an outcome corresponding to the task. The prompt may include a metadata associated with the user. The method may further include contemporaneously analyzing each of the set of user actions based on a set of authentication parameters. The method may further include generating a task validation report corresponding to the outcome of the task in response to analyzing each of the set of user actions. The method may further include assigning an NFT to the outcome and the task validation report associated with the task.

In another embodiment, a system for authenticating an outcome using Non-Fungible Tokens (NFTs) is disclosed. The system may include a processor, and a memory communicatively coupled to the processor. The memory includes processor-executable instructions, which when executed by the processor causes the processor to record in real-time, each of a set of user actions corresponding to a task based on a prompt received from a user. It should be noted that each of the set of user actions may be performed by the user to generate an outcome corresponding to the task. The prompt may include a metadata associated with the user. The processor-executable instructions, on execution, may further cause the processor to contemporaneously analyze each of the set of user actions based on a set of authentication parameters. The processor-executable instructions, on execution, may further cause the processor to generate a task validation report corresponding to the outcome of the task in response to analyzing each of the set of user actions. The processor-executable instructions, on execution, may further cause the processor to assign an NFT to the outcome and the task validation report associated with the task.

In yet another embodiment, a non-transitory computer-readable medium storing computer-executable instruction for authenticating an outcome using Non-Fungible Tokens (NFTs) is disclosed. The stored instructions, when executed by a processor, may cause the processor to perform operations including recording in real-time, each of a set of user actions corresponding to a task based on a prompt received from a user. It should be noted that each of the set of user actions may be performed by the user to generate an outcome corresponding to the task. The prompt may include a metadata associated with the user. The operations may further include contemporaneously analyzing each of the set of user actions based on a set of authentication parameters. The operations may further include generating a task validation report corresponding to the outcome of the task in response to analyzing each of the set of user actions. The operations may further include assigning an NFT to the outcome and the task validation report associated with the task.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following description is presented to enable a person of ordinary skill in the art to make and use the invention and is provided in the context of applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the encryption of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
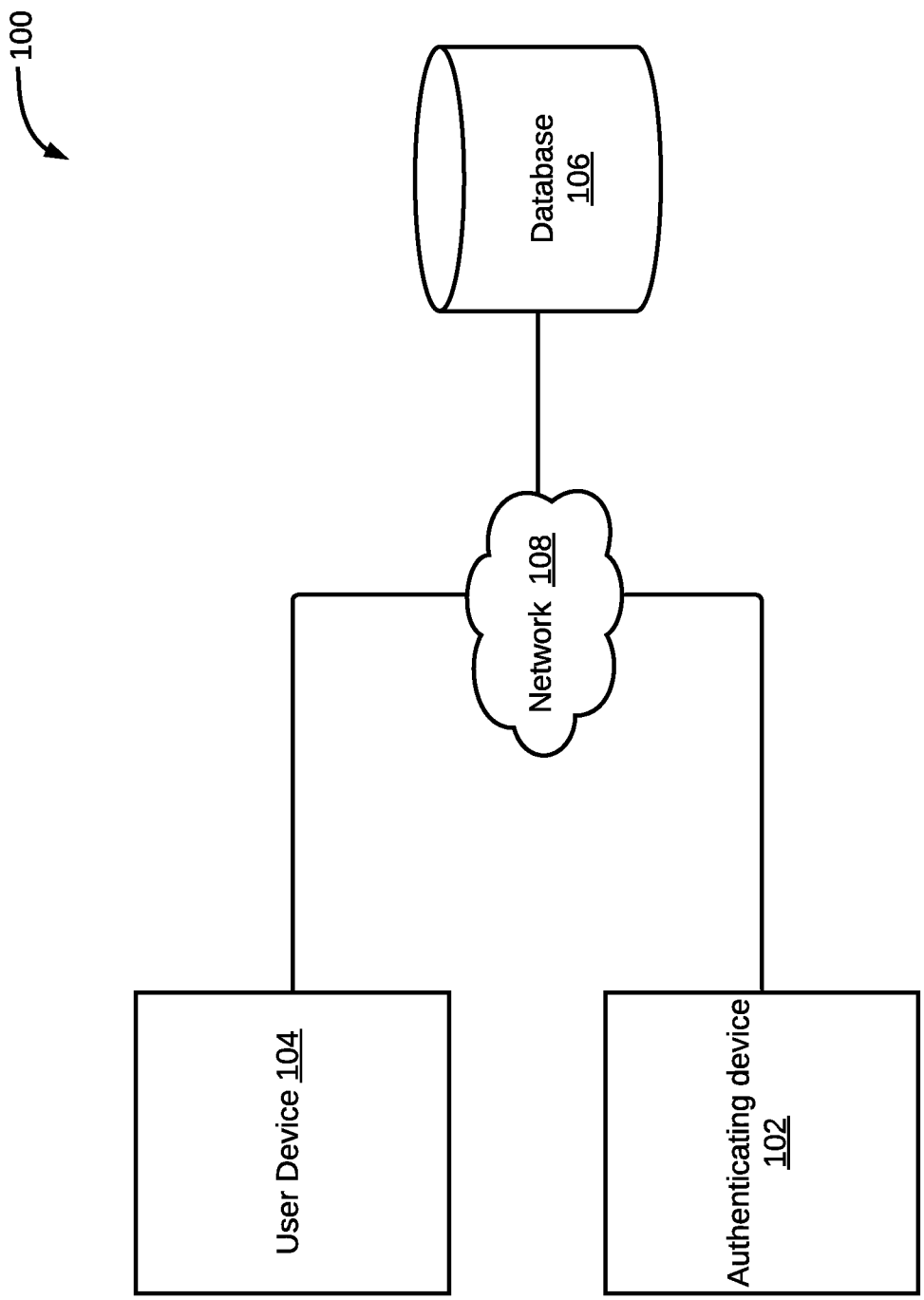
FIG. 1 illustrates a block diagram of a system configured for authenticating an outcome using Non-Fungible Tokens (NFTs), in accordance with some embodiments of the present disclosure.

Referring now to FIG. 1, a block diagram of a system 100 configured for authenticating an outcome using Non-Fungible Tokens (NFTs) is illustrated, in accordance with some embodiment. In an embodiment, the outcome may be generated for a task performed by a user. The outcome may correspond to a content generated by the user for the task. In some embodiments, in order to authenticate the outcome, the authentication device 102 may be integrated with an NFT based authentication service. Further, the NFT based authentication service may be configured to authenticate the outcome. Examples of the authentication device 102 may include, but are not limited to, an application server, a smartphone, a laptop, a desktop, a tablet, and the like. Further, the NFT based authentication service may be an application, a web-service, a cloud-service, a library, or a combination of thereof.

It should be noted that, in order to authenticate the outcome generated for the task, each of a plurality of applications integrated within a user device 104 of the user may be associated with the authentication device 102. Examples of the user device 104 may include, but are not limited to, a laptop, a desktop, a tablet, a smartphone, and the like. In other words, the NFT based authentication service of the authentication device 102 may be associated with the plurality of applications of the user device. A method of associating each of the plurality of applications with the authentication device 102 is further explained in detail in conjunction with FIG. 3. In an embodiment, each of the plurality of applications may correspond to a content creation application. Examples of the plurality of applications may include, but are not limited to, word processing applications (e.g., a Microsoft word, google docs, etc.), spreadsheet applications (e.g., a Microsoft Excel, Google Sheets, Apple Numbers, etc.), presentation applications (e.g., a Microsoft PowerPoint, Google Slides, etc.), photoshop applications (e.g., an Adobe photoshop, a Photoshop Express, a Snapspeed, etc.), illustrator applications (e.g., an Adobe capture, a Vectr, a Paper, etc.), motion applications (e.g., a CodeSandbox, a Filmora Video Editor, etc.), and the like.

It should be noted that, in some embodiments, the NFT based authentication service may be integrated with each of a plurality of existing applications available on an application store. Further, when the user uses an application (i.e., an application integrated on the user device 104 or an application available on the application store), then the NFT based authentication service may authenticate the outcome of each task performed by the user using the application. In some exemplary embodiment, the NFT based authentication service may be an NFT based authentication application. In this case, the user of the user device 104 may download the NFT based authentication application from a memory of the authentication device 102. In yet another exemplary embodiment, the NFT based authentication service may be an NFT based authentication cloud-service. In this case, the user of the user device 104 may need to register with the NFT based authentication cloud-service. Once the user registers himself, the NFT based authentication cloud-service may automatically get integrated with each of the plurality of applications within the user device 104 of the user.

Once the plurality of applications integrated within the user device 104 are associated with the authentication device 102, then whenever the user of the user device 104 may perform the task to generate the outcome, then the authentication device 102 may be configured to receive a prompt. In an embodiment, the authentication device 102 may receive the prompt over a network 108. In other words, the user device 104 may interact with the authentication device 102 and vice versa, over the network 108. The network 108, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In an embodiment, the task may be a digital work that the user needs to do. By way of an example, the task may correspond to an assignment, a digital artwork, e.g., an image, a music, a video, or an animation, a website or webpages designing, a presentation creation, and the like. By way of an example, suppose the task may be the assignment. In this example, the prompt may be a user act, for example, opening a Microsoft word document for generating the outcome for the assignment. By way of another example, suppose the user may want to design a website. In this example, the task may be the website designing. Further, the prompt received from the user may be, e.g., opening a content creation application, e.g., an adobe photoshop that can be used by the user for designing the website.

Further, the prompt may include a metadata associated with the user. The metadata may include authentication details associated with the user. The authentication details may correspond to personal details of the user, such as a name, an age, a date of birth, an email, a gender, etc., associated with the user. Further, the metadata of the user may be encrypted based on an encryption key. In some embodiments, the metadata may not be encrypted. A method of creating the metadata for the user is further explained in detail in conjunction with FIG. 4.

Upon receiving the prompt from the user corresponding to the task, the authentication device 102 may be configured to record a set of user actions corresponding to the task. The set of user actions may be recorded in real time. The set of user actions may be performed by the user to generate the outcome corresponding to the task. The outcome may correspond to the content, or an end product generated by the user for the task by performing the set of user actions. In continuation to the above example, when the task is the assignment, in this case, the outcome may be a response generated by the user for the assignment. Further, the set of user actions performed by the user may be opening the Microsoft word document, typing of text to generate a response for questions present within the assignment, clicking on buttons or links, etc., opening one or more websites, and the like. In some embodiments, the set of user actions performed by the user may be recorded via a camera (not shown) of the user device 104. Further, the recorded set of user actions may be transmitted by the user device 104 to the authentication device 102 in real-time via the network 108.

Further, the authentication device 102 may be configured to contemporaneously analyze each of the set of user actions. In other words, the authentication device 102 may be configured to analyze each of the set of user actions at a same time while recording the set of user actions. In particular, the authentication device 102 may analyze each of the set of user actions parallelly while recording each of the set of user actions. In an embodiment, each of the set of user actions may be analyzed based on a set of authentication parameters. The set of authentication parameters may include, but are not limited to, the set of authentication parameters comprises a number of keystrokes, a number of mouse clicks, a number of applications opened in one or more web browsers, a style and a tone of content within the outcome, a lack of imperfection within the outcome, cultural references used within the outcome, a time taken to produce the outcome, a speed of producing the outcome, plagiarism within the outcome, a creativity of the content of the outcome, and a repetition of words or phrases within the outcome. In addition to these authentication parameters, additional authentication parameters may also be considered to analyze the set of user actions, such as, work iterations performed to generate the outcome, behavior of the user while generating the outcome using images or videos captured of the user via the camera, voice recording captured of the user while generating the outcome using an audio input, and the like.

Further, based on the analysis of each of the set of user actions, the authentication device 102 may be configured to generate a task validation report corresponding to the outcome of the task. The task validation report may include details of a process of generating the outcome corresponding to the task. The task validation report may be used to authenticate ownership of the outcome. In particular, the task validation report may include a recorded proof of process that is performed by the user to generate the outcome for the task. As will be appreciated, the task validation report may be generated to ensure that the outcome for the task has been manually generated (i.e., manually created by the user using existing AI tools, applications, etc., through a keyboard or a mouse of his user device 104) by the user himself using the user device 104.

Once the task validation report is generated, the authentication device 102 may be configured to assign an NFT to the outcome and the task validation report associated with the task. The NFT may be assigned to each task performed by the user to provide a unique identity to the outcome generated by the user for the task. This is done to provide ownership of the outcome produced for the task, to the user. The ownership of the outcome generated by the user for the associated task may be provided to the user by assigning the NFT to the outcome based on the task validation report generated for the task. In an embodiment, the assigned NFT may be used by anyone at any time to validate ownership of the outcome created by the user for the associated task. In addition, the assigned NFT may also help anyone to validate that the outcome owned by the user is created by the user based on the task validation report of the outcome.

Further, the authentication device 102 may be configured to select a blockchain framework for storing the NFT including the outcome and the task validation report. The blockchain framework may correspond to a database 106. The database 106, for example, may be a shared database, i.e., a distributed and decentralized digital ledger. Upon selecting the blockchain framework, the authentication device 102 may store the NFT on the blockchain framework. This is further explained in detail in conjunction with FIG. 5. In addition, the authentication device 102 may identify an NFT repository associated with the user based on an associated private key. The associated private key may be a unique digital signature of the user. Further, upon identifying the NFT repository, the authentication device 102 may associate the NFT to the NFT repository of the user. This is further explained in detail in conjunction with FIG. 6.

By way of an example, suppose the user of the user device 104 may receive an assignment for an employer for a job opportunity. The assignment may include various questions for which the user may need to generate a response (i.e., the outcome). In one scenario, suppose the plurality of applications integrated within the user device 104 may not be associated with the authentication. In this scenario, upon receiving the assignment, the user may generate the response to various questions mentioned within the assignment using a generative Artificial Intelligence tool (e.g., ChatGPT) available online. Further, the user may paste the response generated using the generative AI tool on a word document (e.g., a Microsoft word document). The user may share the word document including the response to each question to the employer. In this scenario, the employer may not be able to identify whether the response submitted by the user for the assignment is written by the user himself or the response is generated using the generative AI tool. In other words, in this scenario, the employer may not be able to validate authenticity of the response submitted by the user for the assignment.

In another scenario, suppose each of the plurality of applications integrated within the user device 104 may be associated with the authentication device 102. In other words, the NFT based authentication service integrated within the authentication device 102 may be associated with each of the plurality of applications installed on the user device 104. In this scenario, upon receiving the assignment, the user may start generating the response to each question present in the assignment on a Microsoft word document. In this scenario, when the user may open the Microsoft word document, then a prompt, e.g., 'a signal indicating the Microsoft word document is opened' may be sent from the user device 104 to the authentication device 102 over the network 108. The prompt may include the metadata of the user, for example, a name of the user, a date of birth of the user, an email address of the user, and the like. Further, the metadata of the user may be encrypted using the encryption key. In some embodiments, the metadata may not be encrypted.

Upon opening the Microsoft word document, the authentication device 102 may start recording the set of user actions performed by the user in real-time, for generating the response for each question mentioned within the assignment. In other words, each of the set of user actions that the user may perform to generate the response for each question may be recorded while the user may be performing each user action. For example, a number of keys pressed by the user on the keyboard, a speed of pressing each key, a number of times a backspace button used by the user for generating the response, and the like. In some embodiments, the set of user actions may be recorded by the camera of the user device 104 and may be transmitted to the authentication device 102 in real-time. Further, the authentication device 102 may at the same time analyze each of the set of user actions based on the set of authentication parameters.

For example, in order to generate the response to each question mentioned within the assignment, the user may have pressed various keys on the keyboard. This pressing of keys may be counted as keystrokes. These counted keystrokes may enable the authentication device 102 to determine whether the response is written by the user, or if the user has generated the response using the generative AI tool. For example, when the user may have typed the response himself, then a number of keystrokes pressed by the user may be more than a number of keystrokes pressed by the user for generating response using the generative AI tool. This is because, in case the response to the question is generated using the generative AI tool, then the user may have copied and pasted the question in the generative AI tool and the response to the question may have been automatically generated.

In a similar manner, while recording of the set of user actions, the authentication device 102 may analyze the response generated for the questions to identify imperfections within the response. This is because, the response manually typed by the user may include errors, such as retyping of words, spelling mistakes within the response, whereas the response generated using the generative AI tool may have none or very few errors. Further, based on the analysis, the task validation report may be generated. The task validation report may include details of a process of generating the response for each question within the assignment. Once the task validation report is generated, an NFT may be assigned to the Microsoft word document including the response to each question within the assignment and the task validation report. Further, the blockchain framework e.g., the database 106 may be selected by the authentication device 102 to store the NFT. In this case, when the user may send the Microsoft word document including the response for the assignment to the employer, then the employer may be able to validate using the assigned NFT that the response for the assignment was manually prepared by the user of the user device 104 based on the task validation report. This complete method of authenticating the outcome using the NFTs is further explained in detail in conjunction with FIGS. 2-6.

Figure 2:
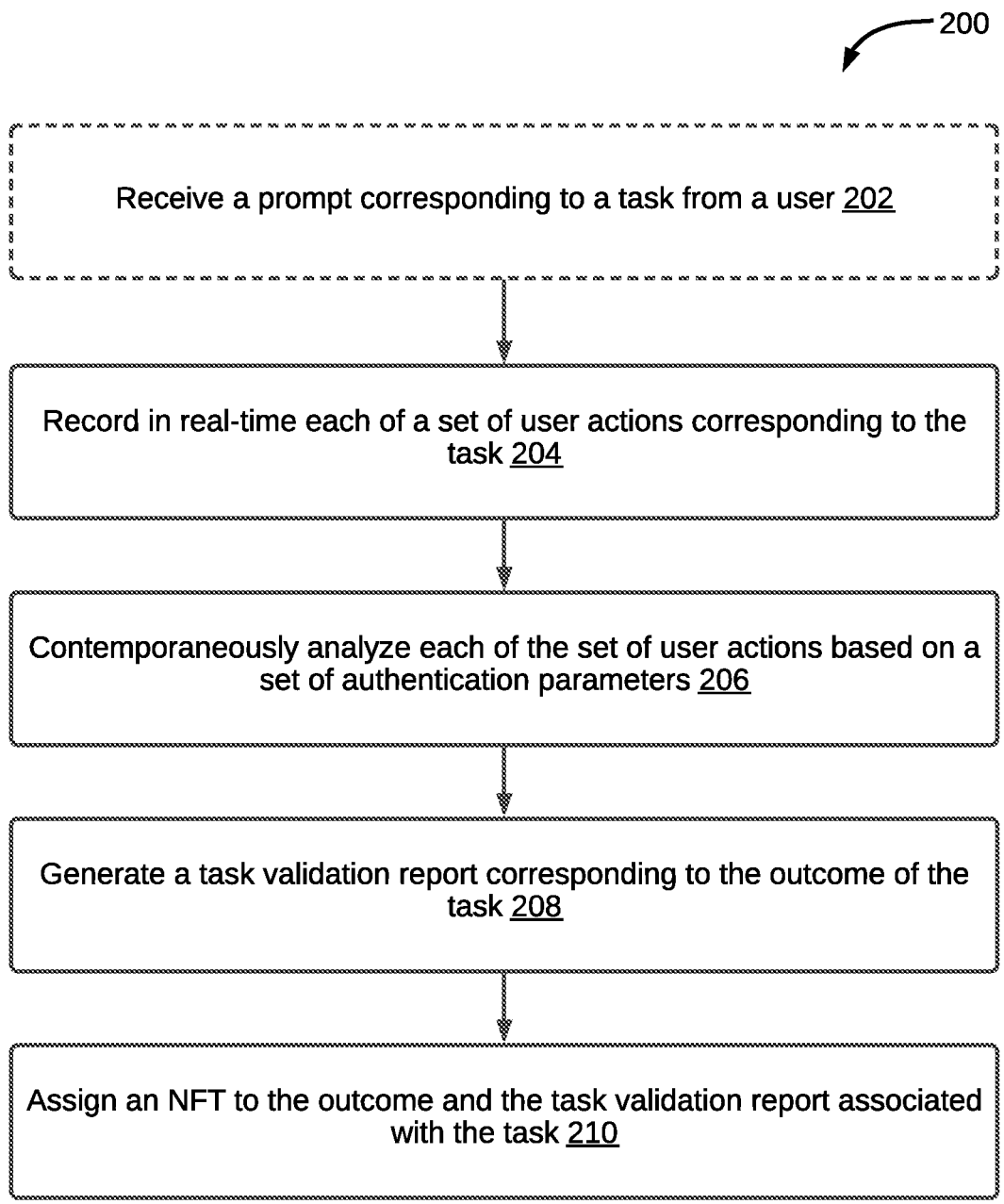
FIG. 2 illustrates a flowchart of a method for authenticating an outcome using NFTs, in accordance with some embodiments of the present disclosure.

Referring now to FIG. 2, a method 200 for authenticating an outcome using NFTs is illustrated via a flowchart, in accordance with some embodiments of the present disclosure. FIG. 2 is explained in conjunction with FIG. 1.

In order to authenticate an outcome using NFTs, initially, at step 202, a prompt corresponding to the task may be received from the user. In particular, the prompt may be received from the user device 104. In an embodiment, the prompt may include a metadata associated with the user. Further, the metadata may be encrypted based on an encryption key. In some embodiments, the metadata may not be encrypted. The task may correspond to any digital work performed by the user using the user device 104. For example, the task may be an assignment, a digital artwork, e.g., an image, a music, a video, or an animation, a website or webpages designing, a presentation creation, and the like.

In an embodiment, the prompt may correspond to a user act that the user does in order to start performing the task. For example, the prompt received from the user may be, e.g., a signal indicating an opening of an application pre-installed on his device (i.e., the user device 104). It should be noted that the prompt may be received via each of a plurality of applications pre-installed within the user device 104 that are associated with the authentication device 102. In some embodiments, the prompt may be received via an existing application of each of a plurality of existing applications that the user may have downloaded from an application store to perform the task. In an embodiment, each of the plurality of applications may correspond to a content creation application. Examples of the plurality of applications may include, but are not limited to, word processing applications (e.g., a Microsoft words, google docs, etc.), spreadsheet applications (e.g., a Microsoft Excel, Google Sheets, Apple Numbers, etc.), presentation applications (e.g., a Microsoft PowerPoint, Google Slides, etc.), photoshop applications (e.g., an Adobe photoshop, a Photoshop Express, a Snapspeed, etc.), illustrator applications (e.g., an Adobe capture, a Vectr, a Paper, etc.), motion applications (e.g., an CodeSandbox, a Filmora Video Editor, etc.), and the like. A method of associating each of the plurality of applications of the user device 104 with the authentication device 102 is further explained in detail in conjunction with FIG. 3.

By way of an example, consider a scenario where a freelance graphic designer named John may receive a project request from a new client to design a logo for their company. In order to design the logo, John may open his preferred graphic design application (e.g., an Adobe Illustrator) installed on his laptop (i.e., the user device 104) to design the logo. It should be noted that, in the current scenario, each application installed within the laptop of John may be associated with the authentication device 102. Further, when John may open the adobe illustrator, the prompt, 'e.g., a signal indicating an opening of the abode illustrator' may be sent by the user device 104 to the authentication device 102. In particular, the signal may be sent via the abode illustrator to the authentication device 102.

Upon receiving the prompt, at step 204, each of a set of user actions corresponding to the task may be recorded in real-time. In an embodiment, each of the set of user actions may be performed by the user to generate the outcome corresponding to the task. The outcome may correspond to a content, or an end product generated for the task, by the user. In continuation to the above example, where John is creating the logo, in this scenario, each of the set of user actions performed by John may be recorded in real-time. In an embodiment, each of the set of user actions may be recorded by the authentication device 102 via the adobe illustrator. In some embodiments, each of the set of user actions may be recorded via a camera of the user device 104 and then transmitted to the authentication device 102 in real-time. For example, in this scenario, the set of user actions performed by John may include a selection of colors, a selection of drawing shapes, a designing of drawings shapes, an addition of text, an adjustment of layout of elements, an addition of visual effects, gradients, shadows, or textures, and the like.

Further, at step 206, each of the set of user actions may be contemporaneously analyzed based on a set of authentication parameters. In other words, while recording the each of the set of user actions, each of the set of user actions may be analyzed at the same time during recording, based on the set of authentication parameters. In an embodiment, the set of authentication parameters may include, but are not limited to, a number of keystrokes, a number of mouse clicks, a number of applications opened in one or more web browsers, a style and a tone of content within the outcome, a lack of imperfection within the outcome, cultural references used within the outcome, a time taken to produce the outcome, a speed of producing the outcome, plagiarism within the outcome, a creativity of the content of the outcome, and a repetition of words or phrases within the outcome. In addition to these authentication parameters, additional authentication parameters may also be considered to analyze the set of user actions, such as, work iterations performed to generate the outcome, behavior of the user while generating the outcome using images or videos captured of the user via the camera, a voice recording captured of the user while generating the outcome using an audio input, and the like.

In continuation to above scenario, where John is designing the logo, in this scenario, the set of user actions, e.g., the selection of colors, the selection of drawing shapes, the designing of drawings shapes, the addition of text, the adjustment of layout of elements, the addition of visual effects, gradients, shadows, or textures, and the like, may be analyzed based on each of the set of authentication parameters and the additional authentication parameters. For example, while designing the logo, John may press multiple keys on a keyboard of his laptop to adjust width, curve, proportions, typography for text, etc. to obtain desired look and feel for the logo. In this case, when John is designing the logo, his actions (i.e., the set of user actions) may be analyzed at the same time when John is designing the logo based on the set of authentication parameters and the additional authentication parameters, such as, a number of keys pressed on the keyboard, a number of mouse clicks, a style and a tone of content within the logo, a time taken to produce the logo, behavior of John (monitored using the camera) while generating the logo, etc. As will be appreciated, analysis of each user action performed by the John may help ensure that a designing process for the logo is genuinely and manually carried out by John and not automated, outsourced, or generated using any Generative AI tools.

Further, based on the analysis of each of the set of user actions, at step 208, a task validation report may be generated corresponding to the outcome of the task. In an embodiment, the task validation report may include details of a process of generating the outcome corresponding to the task. It should be noted that the task validation report may be used to authenticate ownership of the outcome. In continuation to the above example, based on the analysis of each of the set of user actions of John, the task validation report may be generated. The generated task validation report may include details of the designing process followed by the John to generate the logo. In other words, the task validation report may include a recorded proof of process that John carried out to design the logo. The task validation report may be used to authenticate ownership of the logo (i.e., the outcome) by the John.

Once the task validation report is generated, at step 210, an NFT may be assigned to the outcome and the task validation report associated with the task. As will be appreciated, the NFT may be a type of digital asset that represents ownership or a proof of authenticity of the outcome (i.e., the content or the end product). It should be noted that the NFT may contain an outcome metadata, such as details of creator (i.e., the user who may have generated the outcome), a time and a date of creation of the outcome, and other similar relevant information, that defines uniqueness, ownership, and other attributes associated with the outcome. The ownership of the outcome may be provided to the user based on the metadata associated with the user that is received via the prompt. This is further explained in detail in conjunction with FIG. 6. In continuation to the above example, where John is designing the logo, once the task validation report for the logo is generated, the NFT may be assigned to the logo and the task validation report generated for the designing process of the logo. Further, the assigned NFT may be stored on the blockchain framework. As will be appreciated, the blockchain framework may be a shared database or a distributed and decentralized digital ledger (e.g., the database 106). A method of storing the NFT on the blockchain framework is further explained in detail in conjunction with FIG. 5. Once the NFT is stored on the blockchain network, anyone can authenticate the process of generation of the outcome and the outcome using the NFT. In addition to storing the NFT on the blockchain framework, the NFT may be associated to the NFT repository created for John. A method of associating the NFT to the NFT repository of the user is further explained in detail in conjunction with FIG. 5.

Figure 3:
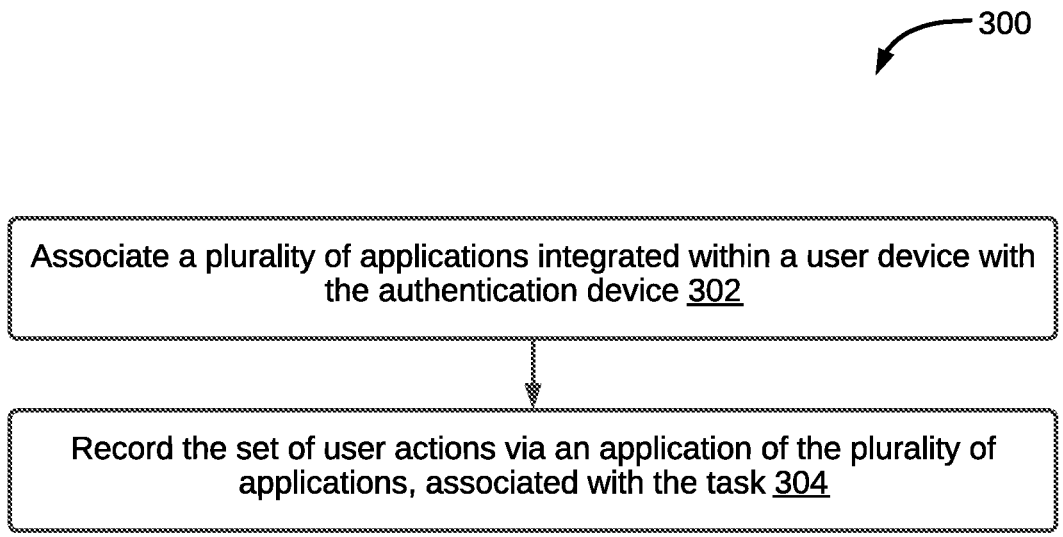
FIG. 3 illustrates a flowchart of a method for associating a plurality of applications to record a set of user actions, in accordance with some embodiments of the present disclosure.

Referring now to FIG. 3, a method 300 for associating a plurality of applications to record a set of user actions is illustrated via a flowchart, in accordance with some embodiments of the present disclosure. FIG. 3 is explained in conjunction with FIGS. 1 and 2.

With reference to FIG. 2, as mentioned via step 204, in order to record the set of user actions in real-time, initially, at step 302, the plurality of applications integrated within a user device (i.e., the user device 104) may be associated with an authentication device (i.e., the authentication device 102). As already explained in FIG. 1, the authentication device 102 may be integrated with the NFT based authentication service. The authentications device 102 may use the NFT based authentication service to authenticate outcomes generated by various users using an associated user device. For this, each of the plurality of applications may be associated with the authentication device 102. In other words, each of the plurality of applications may correspond to an application that pre-installed within the user device 104. Examples of the user device 104 may include, but are not limited to, a laptop, a desktop, a tablet, a smartphone, and the like. In an embodiment, each of the plurality of applications may correspond to a content creation application. Examples of the plurality of applications may include, but are not limited to, word processing applications (e.g., a Microsoft words, google docs, etc.), spreadsheet applications (e.g., a Microsoft Excel, Google Sheets, Apple Numbers, etc.), presentation applications (e.g., a Microsoft PowerPoint, Google Slides, etc.), photoshop applications (e.g., an Adobe photoshop, a Photoshop Express, a Snapspeed, etc.), illustrator applications (e.g., an Adobe capture, a Vectr, a Paper, etc.), motion applications (e.g., a CodeSandbox, a Filmora Video Editor, etc.), and the like.

As will be appreciated, in some embodiments, the plurality of applications may correspond to the plurality of existing applications that are configured to associate the NFT based authentication service of the authentication device 102 with each of the plurality of existing applications. In this scenario, any exiting applications that the user may download from the application store may be associated with the NFT based authentication service of the authentication device 102.

In some exemplary embodiment, the NFT based authentication service of the authentication device 102 may be the NFT based authentication application. In this embodiment, the user of the user device 104 may download the NFT based authentication application from a memory of the authentication device 102. Further, the user may sign-in with the NFT based authentication application. Upon sign-in with the authenticate NFT based authentication application, the NFT based authentication application may get associated with each of the plurality of applications within the user device 104. In yet another exemplary embodiment, the NFT based authentication service may be the NFT based authentication cloud-service. In this case, the user of the user device 104 may need to register with the NFT based authentication cloud-service. Once the user registers himself, the NFT based authentication cloud-service may automatically get associated with each of the plurality of applications within the user device 104.

Once each of the plurality of applications is associated with the authentication device 102, then at step 304, the set of user actions may be recorded via an application of the plurality of applications, associated with the task. The application may correspond to any content creation application used by the user for generating the outcome for the task. In other words, once each of the plurality of applications is associated with the authentication device 102, the authentication device 102 may continuously monitor and record each of the set of user actions using the plurality of applications. In other words, whenever the user may open any application that is associated with the authentication device 102 to perform the task, the authentication device 102 may record the set of user actions via the application. For example, if the user open a Microsoft excel sheet to perform the task, then the set of user actions may be recorded via the Microsoft excel sheet opened by the user to perform the task. In some embodiments, the set of user actions may be recorded in real-time via the camera of the user device 104. The camera may be configured to capture images or videos, that may be processed by the authentication device 102 to determine the set of user actions and perform analysis of the set of user actions based on the set of authentication parameters and the additional authentication parameters.

Figure 4:
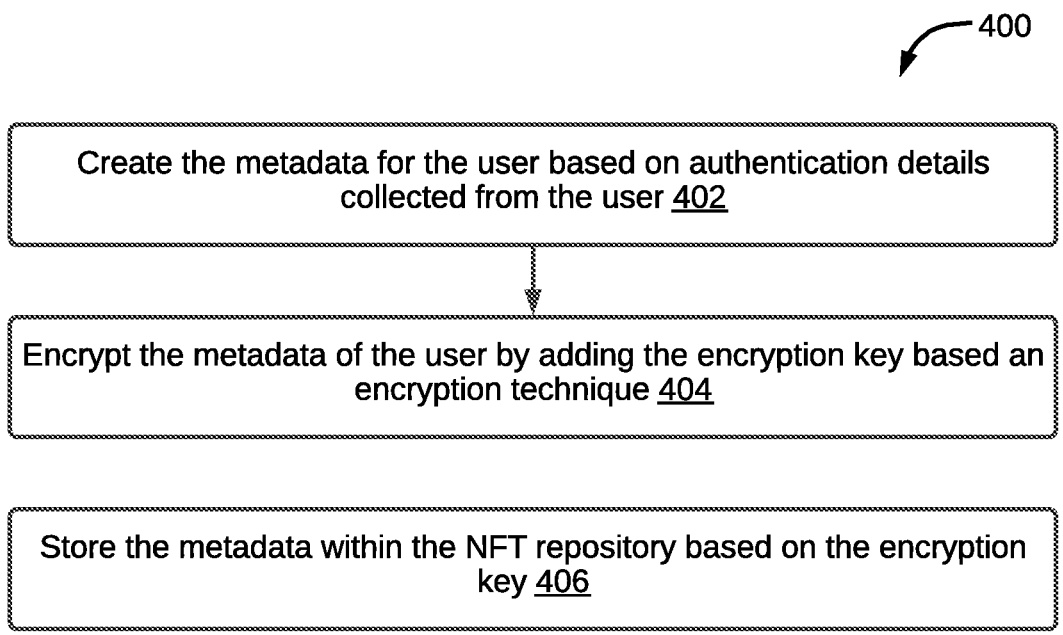
FIG. 4 illustrates a flowchart of a method for creating a metadata for a user, in accordance with some embodiments of the present disclosure.

Referring now to FIG. 4, a method 400 of creating a metadata for a user is illustrated via a flowchart, in accordance with some embodiments of the present disclosure. FIG. 4 is explained in conjunction with FIGS. 1-3.

At step 402, the metadata may be created for the user. The metadata may be created based on the authentication details collected from the user. In an embodiment, the authentication details may correspond to personal details of the user, such as a name, an age, a date of birth, an email, a gender, etc., associated with the user. In some embodiments, the authentication details may be collected when the user may download any existing application that is associated with the authentication device 102 from the application store. In some another embodiment, the authentication details may be collected when the user may sign-in with the authentication device 102 or register with the authentication device 102. Once the authentication details are collected, the collected authentication details may be used to create the metadata for the user.

Upon creating the metadata, at step 404, the metadata of the user may be encrypted. The metadata may be encrypted by adding the encryption key based on the encryption technique. As would be appreciated, the metadata may be encrypted to enhance security and privacy of the authentication details of the user to prevent unauthorized access to personal details (i.e., the authentication details) of the user. It should be noted that, any existing encryption technique, such as a symmetric encryption technique, an asymmetric encryption technique, a hashing technique, an authenticated encryption technique, and the like, may be used to encrypt the metadata of the user using the encryption key. In some embodiments, the metadata may not be encrypted.

Once the metadata is encrypted, at step 406, the metadata may be stored within the NFT repository based on the encryption key. The NFT repository may correspond to a database that is configured for storing the metadata of the user. In an embodiment, the metadata of the user may be encrypted and stored within the NFT repository to associate the NFT assigned to the outcome generated by the user to his corresponding NFT repository based on the metadata stored within the NFT repository and the metadata received along with the prompt. This is done to provide ownership of the outcome to the user based on the metadata associated with the user. This is further explained in detail in conjunction with FIG. 6.

Figure 5:
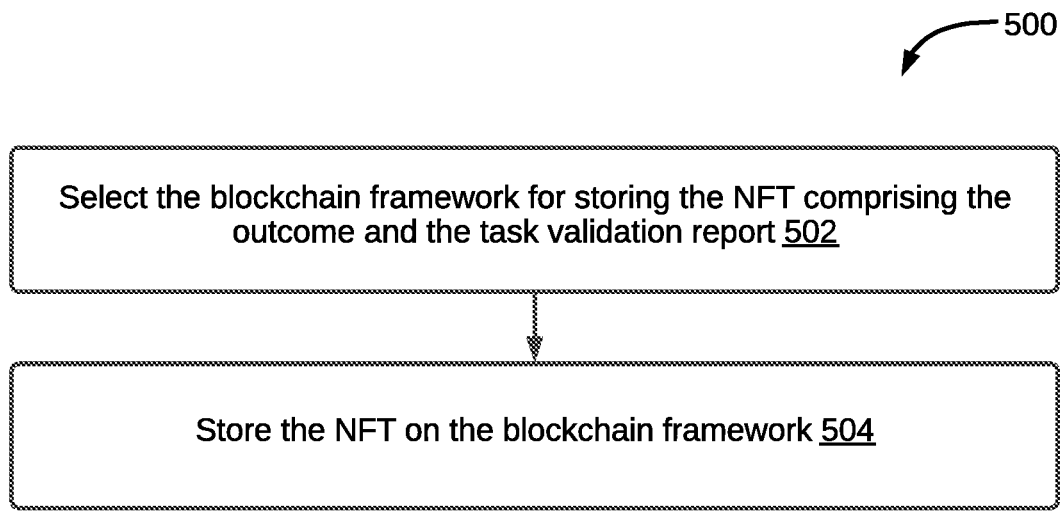
FIG. 5 illustrates a flowchart of a method of storing an NFT on a blockchain framework, in accordance with some embodiments of the present disclosure.

Referring now to FIG. 5, a method 500 of storing an NFT on a blockchain framework is illustrated via a flowchart, in accordance with some embodiments of the present disclosure. FIG. 5 is explained in conjunction with FIGS. 1-4.

With reference to FIG. 2, once the NFT is assigned as mentioned via step 210, at step 502, the blockchain framework may be selected. The blockchain framework may be selected for storing the NFT including the outcome and the task validation report. As will be appreciated, the blockchain framework may be a shared database or a distributed and decentralized digital ledger (e.g., the database 106). In an embodiment, the blockchain framework may be selected based on various factors that includes specific requirements of the task and the corresponding outcome and its task validation report, capabilities of different blockchain frameworks, interoperability associated with the task and the corresponding outcome and its task validation report, scalability of the task, and the like.

Once the blockchain framework is selected, at step 504, the NFT may be stored on the blockchain framework. In other words, the selected blockchain framework may be used to store the NFT that includes the outcome and the task validation report. In an embodiment, the selected blockchain framework may store the NFT as a digital asset that is immutable. The assigned NFT may enable anyone to verify authenticity of the outcome generated by the user. As will be appreciated, the NFT may include outcome metadata of the outcome and the task validation report. The outcome metadata may include details of creator (i.e., the user who may have generated the outcome), time and date of creation of the outcome, and other similar relevant information.

Figure 6:
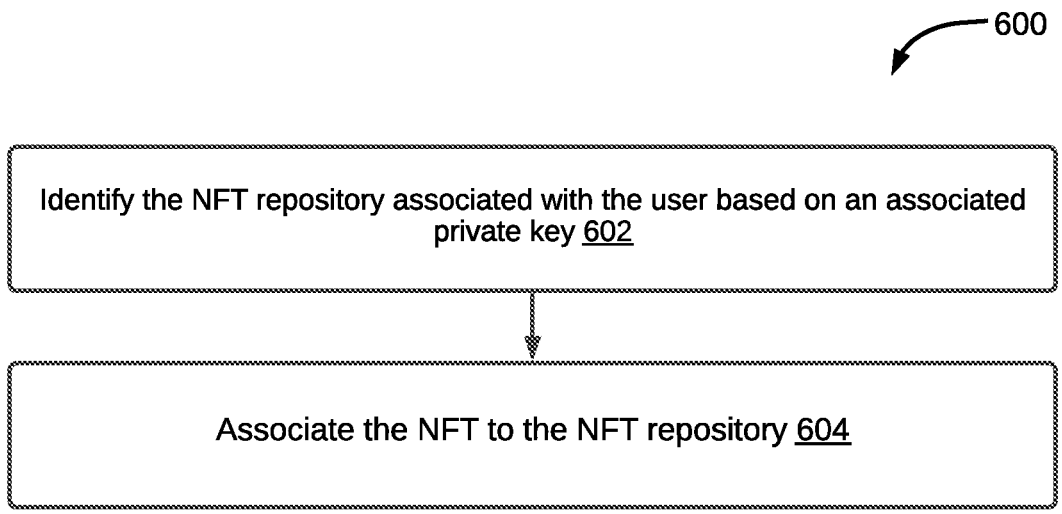
FIG. 6 illustrates a flowchart of a method of associating an NFT to an NFT repository, in accordance with some embodiments of the present disclosure.

Referring now to FIG. 6, a method 600 of associated an NFT to an NFT repository is illustrated via a flowchart, in accordance with some embodiments of the present disclosure. FIG. 6 is explained in conjunction with FIGS. 1-5.

At step 602, the NFT repository associated with the user may be identified based on an associated private key. The private key may correspond to a unique digital signature associated with the user. In an embodiment, the private key may be generated while collecting the authentication details of the user for creating the metadata. In other words, while collecting the authentication details, the private key for the user may be randomly generated. The private key may be a secret string (unique for each user) that includes combinations of numbers and letters. Further, this private key may enable the user to access his digital assets available on the blockchain framework.

Once the NFT repository associated with the user is identified, then at step 604, the NFT may be associated with the NFT repository. In particular, the NFT that includes the outcome and the task validation report for the task may be stored in the NFT repository of the user. This is done to provide ownership of the outcome generated for the task to the user. The ownership of the outcome is provided by associating the NFT assigned to the outcome and the task validation report with the NFT repository. Once the NFT is linked to the NFT repository of the user, no one can alter, change, or split the NFT.

Further, the NFT assigned to the task may be used by anyone to determine ownership of the outcome along with the corresponding task validation report of the task. In other words, the NFT associated with the outcome may enable anyone to identify or validate ownership of the outcome generated for the task belonging to a particular user. In addition to validation of the ownership, the NFT may enable anyone to identify that the outcome was prepared by the user himself based on the task validation report generated for the outcome. This is because, the task validation report may include details of the process of generating the outcome by the user.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
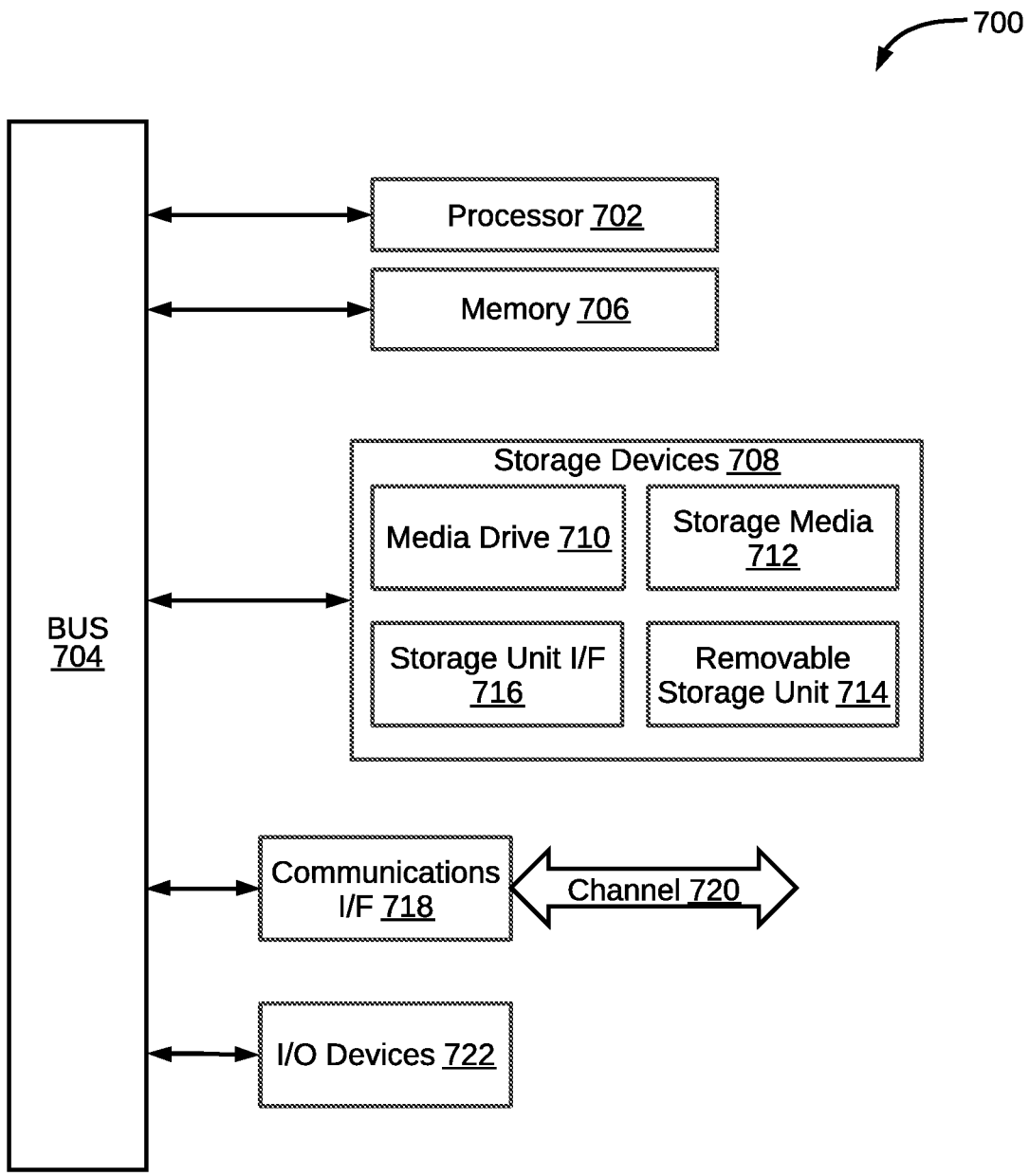
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, an exemplary computing system 700 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 700 may represent, for example, a user device such as a desktop, a laptop, a mobile phone, personal entertainment device, DVR, and so on, or any other type of special or general-purpose computing device as may be desirable or appropriate for a given application or environment. The computing system 700 may include one or more processors, such as a processor 702 that may be implemented using a general or special purpose processing engine such as, for example, a microprocessor, microcontroller or other control logic. In this example, the processor 702 is connected to a bus 704 or other communication medium. In some embodiments, the processor 702 may be an Artificial Intelligence (AI) processor, which may be implemented as a Tensor Processing Unit (TPU), or a graphical processor unit, or a custom programmable solution Field-Programmable Gate Array (FPGA).

The computing system 700 may also include a memory 706 (main memory), for example, Random Access Memory (RAM) or other dynamic memory, for storing information and instructions to be executed by the processor 702. The memory 706 also may be used for storing temporary variables or other intermediate information during execution of instructions to be executed by the processor 702. The computing system 700 may likewise include a read only memory ("ROM") or other static storage device coupled to the bus 704 for storing static information and instructions for the processor 702.

The computing system 700 may also include storage devices 708, which may include, for example, a media drive 710 and a removable storage interface. The media drive 710 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 712 may include, for example, a hard disk, magnetic tape, flash drive, or other fixed or removable medium that is read by and written to by the media drive 710. As these examples illustrate, the storage media 712 may include a computer-readable storage medium having stored therein particular computer software or data.

In alternative embodiments, the storage devices 708 may include other similar instrumentalities for allowing computer programs or other instructions or data to be loaded into the computing system 700. Such instrumentalities may include, for example, a removable storage unit 714 and a storage unit interface 716, such as a program cartridge and cartridge interface, a removable memory (for example, a flash memory or other removable memory module) and memory slot, and other removable storage units and interfaces that allow software and data to be transferred from the removable storage unit 714 to the computing system 700.

The computing system 700 may also include a communications interface 718. The communications interface 718 may be used to allow software and data to be transferred between the computing system 700 and external devices. Examples of the communications interface 718 may include a network interface (such as an Ethernet or other NIC card), a communications port (such as for example, a USB port, a micro-USB port), Near field Communication (NFC), etc. Software and data transferred via the communications interface 718 are in the form of signals which may be electronic, electromagnetic, optical, or other signals capable of being received by the communications interface 718. These signals are provided to the communications interface 718 via a channel 720. The channel 720 may carry signals and may be implemented using a wireless medium, wire or cable, fiber optics, or other communications medium. Some examples of the channel 720 may include a phone line, a cellular phone link, an RF link, a Bluetooth link, a network interface, a local or wide area network, and other communications channels.

The computing system 700 may further include Input/Output (I/O) devices 722. Examples may include, but are not limited to a display, keypad, microphone, audio speakers, vibrating motor, LED lights, etc. The I/O devices 722 may receive input from a user and also display an output of the computation performed by the processor 702. In this document, the terms "computer program product" and "computer-readable medium" may be used generally to refer to media such as, for example, the memory 706, the storage devices 708, the removable storage unit 714, or signal(s) on the channel 720. These and other forms of computer-readable media may be involved in providing one or more sequences of one or more instructions to the processor 702 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into the computing system 700 using, for example, the removable storage unit 714, the media drive 710 or the communications interface 718. The control logic (in this example, software instructions or computer program code), when executed by the processor 702, causes the processor 702 to perform the functions of the invention as described herein.

As will be appreciated by those skilled in the art, the techniques described in the various embodiments discussed above are not routine, or conventional, or well understood in the art. The techniques discussed above provide for authenticating an outcome using Non-Fungible Tokens (NFTs). The techniques may first record in real-time, each of a set of user actions corresponding to a task based on a prompt received from a user. Each of the set of user actions may performed by the user to generate an outcome corresponding to the task. The prompt may include a metadata associated with the user. The techniques may then contemporaneously analyze each of the set of user actions based on a set of authentication parameters. The techniques may then generate a task validation report corresponding to the outcome of the task in response to analyzing each of the set of user actions. The techniques may then assign an NFT to the outcome and the task validation report associated with the task.

Thus, the disclosed method and system try to overcome the technical problem of authenticating an outcome using Non-Fungible Tokens (NFTs). The disclosed method and system may provide authenticity to tasks performed by users by assigning an NFT to a task. In other words, the disclosed method and system may establish user's ownership for their work (i.e., the task). To provide authenticity to the task, the disclosed method and the system may be easily integrated with a wide range of content creation applications, such as, word processing applications, spreadsheet applications, etc. This versatility ensures applicability of the disclosed method and system across various domains and industries. Further, the disclosed method and system may enable any individual to verify authenticity of the user's work by checking an associated NFT, that would otherwise be challenging to identify. In other words, the disclosed method and system may provide a robust solution for authenticating user generated outcomes, providing assurance of ownership and integrity for the outcome.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a method and system for authenticating an outcome using Non-Fungible Tokens (NFTs). The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for authenticating an outcome using Non-Fungible Tokens (NFTs), the method comprising:
    recording in real-time, by an authentication device, each of a set of user actions corresponding to a task based on a prompt received from a user, wherein each of the set of user actions are performed by the user to generate an outcome corresponding to the task, and wherein the prompt comprises a metadata associated with the user;
    contemporaneously analyzing, by the authentication device, each of the set of user actions based on a set of authentication parameters;
    generating, by the authentication device, a task validation report corresponding to the outcome of the task in response to analyzing each of the set of user actions; and
    assigning, by the authentication device, an NFT to the outcome and the task validation report associated with the task.

2. The method of claim 1, further comprising receiving the prompt corresponding to the task from the user.

3. The method of claim 1, further comprising:
    associating a plurality of applications integrated within a user device with the authentication device; and
    recording the set of user actions via an application of the plurality of applications, associated with the task.

4. The method of claim 1, further comprising:
    creating the metadata for the user based on authentication details collected from the user;
    encrypting the metadata of the user by adding the encryption key based an encryption technique; and
    storing the metadata within an NFT repository based on the encryption key.

5. The method of claim 1, further comprising:
    selecting a blockchain framework for storing the NFT comprising the outcome and the task validation report; and
    storing the NFT on the blockchain framework.

6. The method of claim 1, further comprising:
    identifying an NFT repository associated with the user based on an associated private key; and
    associating the NFT to the NFT repository.

7. The method of claim 1, wherein the set of authentication parameters comprises a number of keystrokes, a number of mouse clicks, a number of applications opened in one or more web browsers, a style and a tone of content within the outcome, a lack of imperfection within the outcome, cultural references used within the outcome, a time taken to produce the outcome, a speed of producing the outcome, plagiarism within the outcome, a creativity of the content of the outcome, and a repetition of words or phrases within the outcome.

8. The method of claim 1, wherein the task validation report comprises details of a process of generating the outcome corresponding to the task, and wherein the task validation report is used to authenticate ownership of the outcome.

9. A system for authenticating an outcome using Non-Fungible Tokens (NFTs), the system comprising:
    a processor; and
    a memory coupled to the processor, wherein the memory stores processor executable instructions, which, on execution, causes the processor to:
        record in real-time, each of a set of user actions corresponding to a task based on a prompt received from a user, wherein each of the set of user actions are performed by the user to generate an outcome corresponding to the task, and wherein the prompt comprises a metadata associated with the user;
        contemporaneously analyze each of the set of user actions based on a set of authentication parameters;
        generate a task validation report corresponding to the outcome of the task in response to analyzing each of the set of user actions; and
        assign an NFT to the outcome and the task validation report associated with the task.

10. The system of claim 9, wherein the processor-executable instructions, on execution, further cause the processor to receive the prompt corresponding to the task from the user.

11. The system of claim 9, wherein the processor-executable instructions on execution further cause the processor to:
    associate a plurality of applications integrated within a user device with the authentication device; and
    record the set of user actions via an application of the plurality of applications, associated with the task.

12. The system of claim 9, wherein the processor-executable instructions, on execution, further cause the processor to:
    create the metadata for the user based on authentication details collected from the user;
    encrypt the metadata of the user by adding the encryption key based an encryption technique; and
    store the metadata within an NFT repository based on the encryption key.

13. The system of claim 9, wherein the processor-executable instructions, on execution, further cause the processor to:
    select a blockchain framework for storing the NFT comprising the outcome and the task validation report; and
    store the NFT on the blockchain framework.

14. The system of claim 9, wherein the processor executable instructions, on execution, further cause the processor to
identify an NFT repository associated with the user based on an associated private key; and
associate the NFT to the NFT repository.

15. The system of claim 9, wherein the set of authentication parameters comprises a number of keystrokes, a number of mouse clicks, a number of applications opened in one or more web browsers, a style and a tone of content within the outcome, a lack of imperfection within the outcome, cultural references used within the outcome, a time taken to produce the outcome, a speed of producing the outcome, plagiarism within the outcome, a creativity of the content of the outcome, and a repetition of words or phrases within the outcome.

16. The system of claim 9, wherein the task validation report comprises details of a process of generating the outcome corresponding to the task, and wherein the task validation report is used to authenticate ownership of the outcome.

17. A non-transitory computer-readable medium storing computer-executable instructions for authenticating an outcome using Non-Fungible Tokens (NFTs), the stored instructions, when executed by a processor, cause the processor to perform operations comprises:
recording in real-time, each of a set of user actions corresponding to a task, based on a prompt received from a user, wherein each of the set of user actions are performed by the user to generate an outcome corresponding to the task, and wherein the prompt comprises a metadata associated with the user;
contemporaneously analyzing, each of the set of user actions based on a set of authentication parameters;
generating, a task validation report corresponding to the outcome of the task in response to analyzing each of the set of user actions; and
assigning, an NFT to the outcome and the task validation report associated with the task.

\* \* \* \* \*